United States Patent [19]
Valeri

[11] 4,067,258
[45] Jan. 10, 1978

[54] CROSSOVER UNIT UTILIZING SLOTTED PAD AND WEDGE-SHAPED CLOSURE STRIP

[75] Inventor: William J. Valeri, Pengilly, Minn.

[73] Assignee: Irathane Systems Incorporated, Hibbing, Minn.

[21] Appl. No.: 718,478

[22] Filed: Aug. 30, 1976

[51] Int. Cl.² .............................................. E01B 7/28
[52] U.S. Cl. .................................................... 104/275
[58] Field of Search .............. 104/275, 277; 174/70 C, 174/72 C, 97

[56] References Cited

U.S. PATENT DOCUMENTS

| 284,643 | 9/1883 | Lenderoth | 174/97 |
|---|---|---|---|
| 737,997 | 9/1903 | Burk | 174/97 |
| 2,299,356 | 10/1942 | Strohm et al. | 104/275 |
| 3,888,186 | 6/1975 | Jentzsch et al. | 104/275 |

FOREIGN PATENT DOCUMENTS

767,574  2/1957  United Kingdom ................. 104/275

*Primary Examiner*—Robert J. Spar
*Assistant Examiner*—Carl Rowold
*Attorney, Agent, or Firm*—Stuart R. Peterson

[57] ABSTRACT

The crossover unit includes a polyurethane pad having a slot extending downwardly and then laterally or horizontally beneath an overhanging lip. A wedge-shaped rubber insert or plug is received in the slot which not only closes the slot, but also resists deflection of the lip when heavy vehicles traverse the unit so that sufficient space is maintained beneath the lip for the protective accommodation of an electric power cable or hose. In a second embodiment the slot extends in opposite lateral directions between a pair of overhanging lips, the insert in this instance being received between the two lips so that space exists under the lips for two cables or hoses.

9 Claims, 5 Drawing Figures

CROSSOVER UNIT UTILIZING SLOTTED PAD AND WEDGE-SHAPED CLOSURE STRIP

BACKGROUND OF THE INVENTION

1. Field of the Invention

This invention relates generally to crossover units, and pertains more particularly to a polyurethane pad having at least one laterally extending slot portion in which a section of an electric power cable or the like is contained, the entrance to the slot being closed by a wedge-shaped closure plug.

2. Description of the Prior Art

Various crossover pads have been deviced. Some are entirely of metal, some entirely of elastomeric material, and others combinations of such materials. For various reasons, the trend at the moment is decidedly in the direction of utilizing elastomeric materials, such as rubber and/or polyurethane. Generally speaking, crossover pads of elastomeric materials lend themselves readily to fabrication by customary molding techniques. However, owing to the severity of the loads passing thereover, particularly if the cable or hose passing through the crossover pad should not shoulder any appreciable percentage of the load, the pad must be designed so that the weight of the traversing vehicle does not deform the pad to such a degree that the load is applied to the cable or hose. If the elastomeric material used in the pad construction is quite resilient, then the usual procedure is to make the pad sufficiently thick so that when partially compressed it will not be deformed to such an extent so as to cause any sizable portion of the load to press against the cable or hose. Of course, any increase in pad height or thickness provides more of a "bump" over which the vehicle must pass. The bumping action can be moderated by having inclined ramps that slope only gradually upwardly, but then the width of the pad is unduly increased. The easiest way out of such a situation is to design the pad with an appreciable thickness and with a limited width, the resulting bumping action, owing to the height and relatively steep ramps, simply being accepted as a necessary condition. While it is possible to make the crossover pads relatively rigid, the lessened resiliency renders them more frangible and the inability to flex when placed on uneven ground results in breakage when subjected to sizable crossover loads.

SUMMARY OF THE INVENTION

Accordingly, a general object of the invention is to provide a crossover unit that will effectively withstand heavy loads caused by large vehicles passing thereover, and yet which will satisfactorily protect the cable or hose passing therethrough. More specifically, an aim of the invention is to provide a crossover unit that is not vulnerable to breakage and which will for all intents and purposes avoid any undue loading of the longitudinal section of the cable or hose contained therein.

Another object is to provide a crossover unit that can be easily fabricated, it being within the contemplation of my invention to resort to conventional molding techniques.

Yet another object of the invention is to provide a crossover unit possessing a low vertical profile, thereby minimizing the bumping action that would otherwise occur.

Still another object of the invention is to provide a crossover unit that can be manufactured inexpensively, thereby encouraging its widespread use.

A still further important object of my invention is to provide a unit of the foregoing character that can be configured so as to accommodate therein two separate cables or hoses.

Still further, an object is to provide a crossover pad unit utilizing a wedge-shaped closure plug which plug will be firmly retained in place during use, yet which can be easily removed so as to permit access to the cable or hose and when the cable or hose is to be taken out and the unit moved to a different location. In this regard, mining and construction projects frequently require that the routes via which the vehicles travel be changed, thereby necessitating that crossover pads be moved to different vantage points. However, while the crossover unit is being traversed by heavy equipment, it is important that the closure plug not become loose; the present invention effectively achieves this.

Briefly, my invention contemplates an elongated pad of polyurethane which is molded with a specially configured slot extending longitudinally therethrough. In one embodiment, the slot has a pair of lateral or horizontal slot portions and in a second embodiment only one such slot portion. In the dual situation, a pair of overhanging lips are formed and a wedge-shaped insert or closure plug of rubber bears against the inwardly facing edges of both of the lips. The insert is formed with converging sides and the free edges of the lips are similarly configured. The bottom of the wedge-shaped closure member is received between two parallel ribs at the bottom of the slot. The converging sides of the wedge-shaped insert enhances its retention and at the same time resists deflection of the inwardly extending lips in order to assure that a void or space of ample size is maintained beneath each of the lips for the accomodation of an electric power cable or flexible hose. As far as the single lip embodiment is concerned, an identical wedge-shaped insert or plug is employed, but in this instance one sloping side of the insert bears against a similarly sloping surface at the opposite side of the slot. Here again, the wedge-shaped configuration of the closure member assures its retention. In both embodiments, the extremely heavy loads caused by vehicles, such as use in mining and construction operations, are effectively resisted by the crossover unit so that no appreciable portion of the load is transmitted to the cable or hose.

DESCRIPTION OF THE PREFERRED EMBODIMENTS

Figure 1:
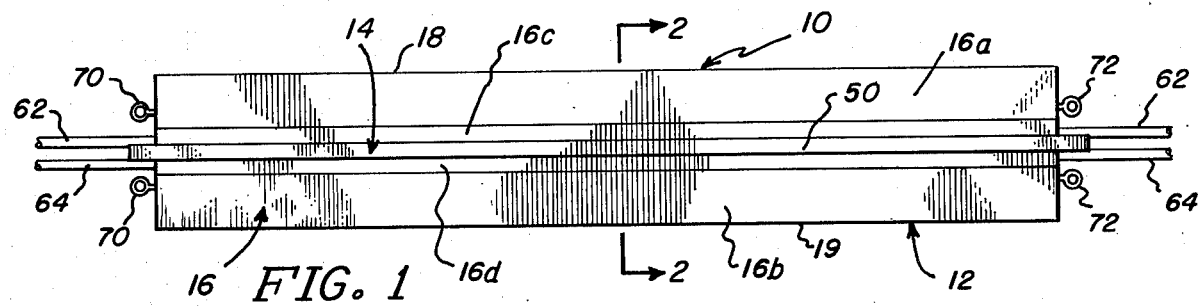
FIG. 1 is a top plan view of one embodiment of my invention in which two separate cables are accommodated.
Figure 2:
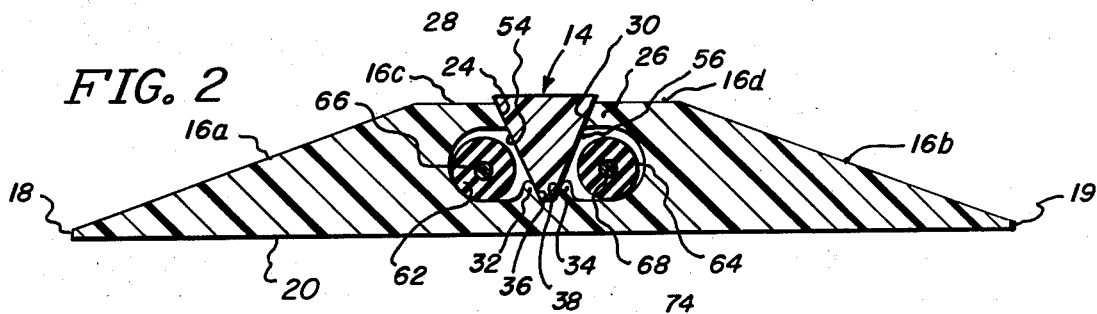
FIG. 2 is a sectional view taken in the direction of line 2—2 of FIG. 1.

Referring first to the embodiment illustrated in FIGS. 1-4, the crossover unit has been denoted in its entirety by the reference numeral 10. The unit 10 is comprised of an elongated elastomeric pad 12, preferably of polyurethane, and an elastomeric insert or closure plug 14, preferably of rubber.

Describing the pad 12 with greater particularity, it will be observed that it is formed with a top surface 16 composed of inclined ramp sections 16a, 16b and horizontal platform sections 16c, 16d. The ramp section 16a inclines upwardly from one side edge 18 and the ramp section 16b inclines upwardly from the opposite side edge 19. The pad 12 has a flat bottom surface 20.

Figure 3:
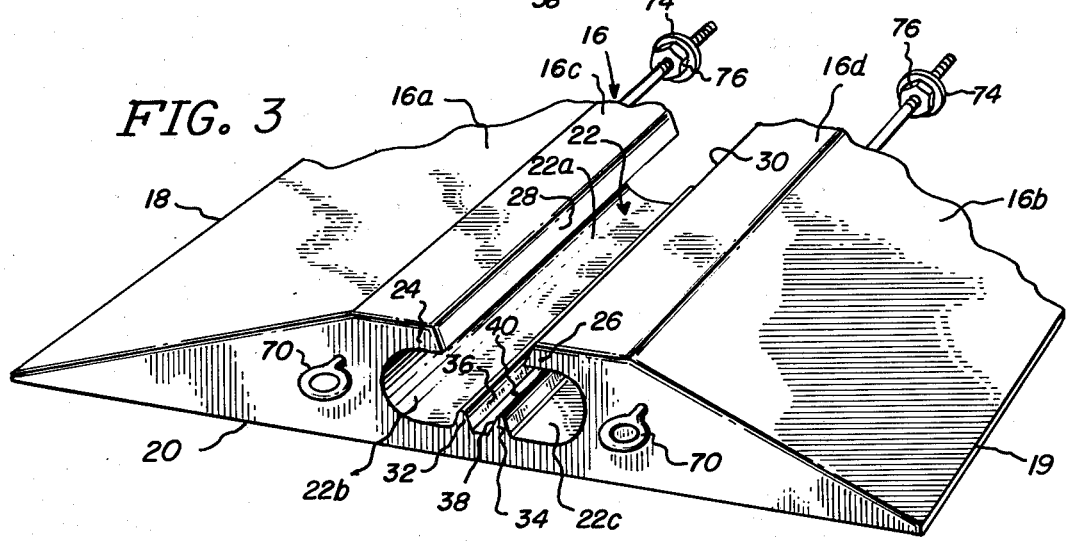
FIG. 3 is a fragmentary perspective view of an end portion of the pad for the purpose of showing to better advantage the slot configuration, the view illustrating the pad before the cables have been placed therein and prior to the insertion of the wedge-shaped closure plug.
Figure 4:
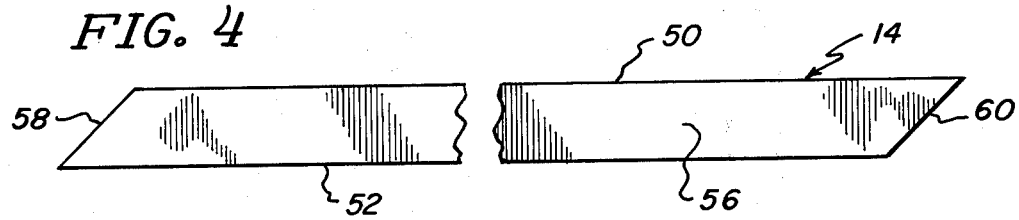
FIG. 4 is a side elevational view of the closure strip or plug, a central portion having been removed due to the size of the drawing sheet.

As best seen in FIG. 3, the pad 12 has a longitudinally directed slot 22 formed therein. The slot 22 has what might be termed an inverted T appearance. Thus, the slot 22 has a vertical leg portion 22a and laterally extending or horizontal leg portions 22b and 22c. In this way, a pair of overhanging integral lips 24 and 26 are formed, the lip 24 residing over the slot portion 22b and the lip portion 26 over the slot portion 22c. The lip 24 is provided with a sloping free edge 28 and the lip 26 with a sloping free edge 30, the edges 28, 30 having a degree of convergence that will shortly be referred to in greater detail.

Attention is now directed to a pair of parallel ribs 32, 34 forming a flat portion 40 therebetween. The ribs 32 and 34 each have a sloping surface 36 and 38, respectively, the convergence of the surfaces 36, 38 corresponding to that imparted to the free edges 28, 30 on the overhanging lips 24 and 26.

Describing now the insert or closure plug 14, it will be discerned that it has a wedge-shaped cross section which is very effective in assuring its retention in the slot 22. More specifically, it has a flat upper surface 50 of a width just a trifle greater than the width of the entrance or upper end of the groove 22, this being the distance between the free edges 28, 30. The bottom 52 is narrower than the top 50, there being converging sides 54 and 56. It will now be appreciated, it is believed, that the degree of convergence or angulation of the sides 54, 56 corresponds to the degree of convergence imparted to the free edges 28, 30 and also to the surfaces 36, 38. The insert or plug 14 is resilient and preferably or rubber, as hereinbefore stated. In this way, due to the compressibility of the rubber, assisted by the convergence of the sides 54, 56, the insert 14 can be readily placed within the slot 22 so as to close completely the entrance thereto between the free edges 28, 30. Also, it will be appreciated that the sides 54, 56 of the insert 14 block the horizontal or lateral slot portions 22b and 22c, respectively. In this way, voids are assured beneath the lip portions 24, 26. From FIG. 4, it will be perceived that the insert 14 is formed with inclined ends 58 and 60 for a reason explained hereinafter.

It is within the lateral or horizontal slot portions 22b and 22c that electric power cables 62 and 64 are contained, the cable 62 illustratively having a conductor 66 extending therethrough and the cable 64 having a similar conductor 68 contained therein. While only one conductor 66 has been shown for the cable 62 and one conductor 68 for the cable 64, it will be appreciated that two conductors can be contained in each cable 62, 64. One of the attributes of the unit 10 is that two horizontal slot portions 22b, 22c are provided so that fairly sizable cables 62 and 64 can be accommodated. Where heavy electrical currents are carried, the conductors 66 and 68 must have a sizable cross section, a cross section adequate for the current.

Although not forming a part of my invention, for the sake of completeness a pair of eye bolts 70 extend into the pad 12 from one end and a similar pair of eye bolts 72 extend into the pad from the other end, each eye bolt 70, 72 having means thereon for anchoring the eye bolt. For the sake of simplicity the anchoring means has been shown as a washer 74 (FIG. 3) having a nut 76 on each side so that the washer 74 remains embedded in the polyurethane material constituting the pad 12 during the molding thereof. The eye bolts 70, 72 permit the pad 12 to be pulled from one vantage point to another; however, other means can be employed.

Having presented the foregoing description, the advantages to be derived from a practicing of my invention are believed to be fairly straightforward. However, it can be pointed out that the wedge-shaped insert or plug 14 engages each of the free edges 28, 30 as well as the surface 40 at the bottom of the slot 22. Since loads of appreciable magnitudes will result from heavily loaded vehicles, such as those used in mining and construction operations, passing over the unit 10, it can be pointed out that when the front wheels of the vehicle pass upwardly over the ramp section 16a onto the platform section 16c and over the upper surface 50 of the closure insert of plug 14, the tendency for the lip 24 to flex downwardly will be resisted by the side 54 of the wedge-shaped insert 14. In this regard, it should be understood that the wedge-shaped insert 14 not only engages both of the free edges 28, 30 of the lips 24, 26, but also engages the bottom surface 40. Therefore, the vertical load applied to the top of the unit 10 is borne substantially by the wedge-shaped insert 14, the insert being simply forced downwardly against the bottom surface 40 and not onto the cable 62. The same thing can be said for the cable 64, for the lip 26 resists downward deformation because its free edge 30 is in engagement with the side 56 of the insert 14.

Of course, the resistance to flexing or deforming as far as the lips 24, 26 are concerned, depends upon the resiliency or compressibility of the insert 14, as well as the resiliency of the polyurethane. Such resiliency factors can be readily taken into account when selecting the precise materials and their durometer factors for the pad 12 and the wedge-shaped insert 14.

It is also believed readily apparent that the cables 62, 64 are placed into the horizontal slot portions 22b, 22c prior to the insertion of the insert or closure plug 14. Once in place, then the insert 14 is simply pressed into the vertical portion 22a of the groove 22 with the consequence that the engagement of its sides 54, 56 with the surfaces 28, 30 and 36, 38 as well as the bottom surface 40 results and performs in the fashion already described. When the pad 12 is relatively short, say, on the order of eight or ten feet, it is planned that the insert 14 be somewhat longer so that the ends 58 and 60 project beyond the ends of the pad 12 to facilitate removal of the insert. When the pad 12 is longer than eight or ten feet, more than one insert 14 is contemplated and in such a situation the end 60 of one insert would overlie the end 58 of the next one to keep dirt out of the slot 22. As already pointed out, the insert 14 resists inadvertent dislodgment, which has been one of the troubles experienced with prior art crossover devices.

Figure 5:
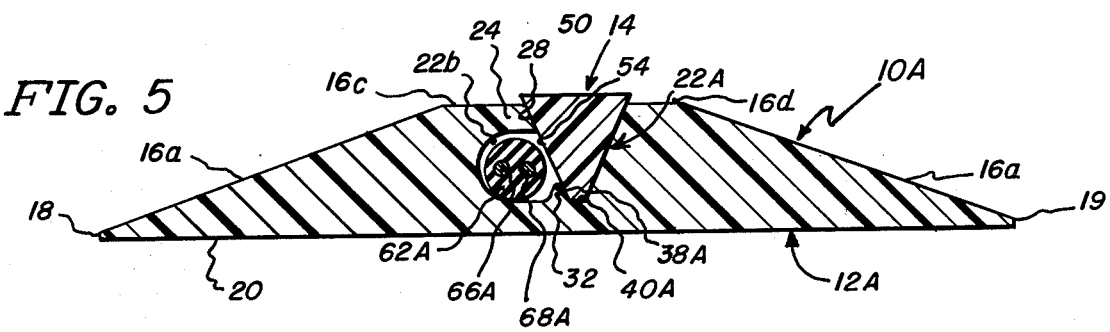
FIG. 5 is a sectional view corresponding to FIG. 2 but depicting a pad intended for receiving only one cable rather than two.

In some situations, only one cable or hose will require accommodation. Of course, it is within the contemplation of the invention to accommodate two or more smaller cables in either slot portion 22b or 22c in lieu of a single larger cable. However, at this time attention is directed to FIG. 5 is which a second embodiment 10A is depicted. The cross sectional view constituting FIG. 5 is believed adequate to illustrate the modified version of the invention. FIG. 5 corresponds to FIG. 2, it might be pointed out. Instead of two horizontal slot portions 22b and 22c, however, the unit 10A contemplates only one horizontal slot portion 22b. Instead of the slot portion 22c, the pad 12A is formed with a sloping surface 38A which constitutes one side of the groove 22A. Thus, instead of the inverted T-shaped configuration of the groove 22, the groove 22A has what might be called an L-shaped configuration.

At any rate, only a single cable 62A is shown having conductors 66A and 68A contained therein. The insert or closure plug 14, being the same as in the unit 10, resists deformation of the lip 24, bearing against its free edge 28. Any tendency of the lip 24 to be flexed downwardly is resisted by the sloping side 54 of the insert 14. Actually, any reactive force is transmitted through the insert 14 to the bottom 40A and also the side 38A. In this way, collapsing of the lip 24 is resisted and the void or space provided by the horizontal slot portion therebeneath 22b is preserved so that for all intents and purposes none of the weight of a vehicle passing over the unit 10A is imposed on the cable 62A. As with the earlier embodiment denoted by the numeral 10, it is particularly beneficial if the item contained within the crossover unit 10A is a flexible hose to prevent any collapsing of the hose, for any collapsing will throttle the fluid flowing therethrough.

I claim:

1. A crossover unit comprising an elongated pad of resilient material having top, bottom and inclined surfaces, said pad having a longitudinally directed slot therein extending downwardly from said top surface and laterally toward one side of said pad to provide an integral lip having a generally vertical free edge with the lateral portion of said slot residing beneath said lip, and an insert received in said slot, said insert engaging the free edge of said lip, a portion of the pad at the opposite side of said slot, as well as a portion of the pad at the bottom of said slot, the top of the insert being adjacent the top surface of said pad and said insert reducing the downward deformation of said lip due to a load on the top surface of the unit so that an elongated member such as a cable can be accommodated in the lateral portion of said slot.

2. A crossover unit in accordance with claim 1 in which said slot also has a portion extending laterally toward the other side of said pad to provide a second integral lip having a generally vertical free edge, said last-mentioned free edge constituting the portion at the opposite side of said slot which is engaged by said insert, whereby a second elongated member such as a cable can be accommodated in the lateral portion of said slot residing beneath said second lip.

3. A crossover unit in accordance with claim 2 in which said insert is wider at its top than at its bottom, thereby providing converging sides.

4. A crossover unit in accordance with claim 3 in which said insert is longer than said pad.

5. A crossover unit in accordance with claim 3 in which said free edges have a slope corresponding to the degree of convergence of the sides of said insert.

6. A crossover unit in accordance with claim 5 including a pair of parallel ribs at the bottom of said slot for receiving the bottom of said insert therebetween.

7. A crossover unit in accordance with claim 6 in which said parallel ribs have sloping surfaces possessing a degree of convergence corresponding to that of the sides of said insert.

8. A crossover unit in accordance with claim 1 in which said pad and insert are of elastomeric material.

9. A crossover unit in accordance with claim 8 in which the elastomeric material constituting said pad is polyurethane and the elastomeric material constituting said insert is rubber.

* * * * *